E. J. SPRAGUE.
Cooking Utensils.
No. 139,433. Patented May 27, 1873.
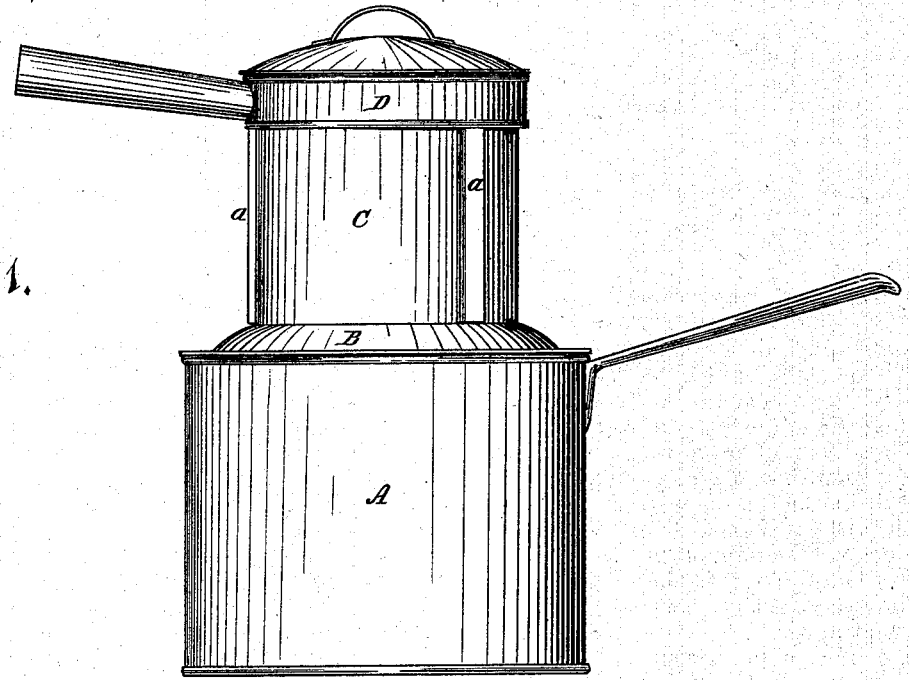
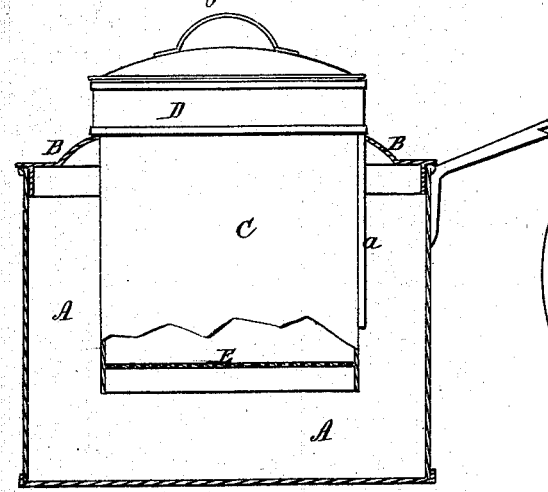
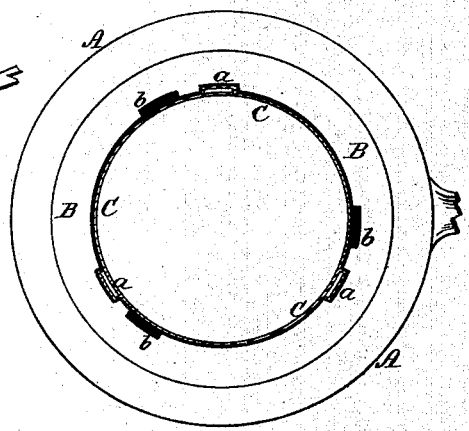
Witnesses:
J. West Wagner,
W. I. Ludlow
Inventor:
Edwin J. Sprague,
By Johnson, Klaucke & Co.
his Attorneys
AM. PHOTO-LITHOGRAPHIC CO. N.Y.(OSBORNE'S PROCESS)

UNITED STATES PATENT OFFICE.

EDWIN J. SPRAGUE, OF YOUNGSTOWN, OHIO.

IMPROVEMENT IN COOKING UTENSILS.

Specification forming part of Letters Patent No. 139,433, dated May 27, 1873; application filed March 22, 1873.

*To all whom it may concern:*

Be it known that I, EDWIN J. SPRAGUE, of Youngstown, in the county of Mahoning and State of Ohio, have invented certain new and useful Improvements in Cooking Utensils, of which the following is a specification:

The object of my invention is to produce a convenient and useful cooking utensil, whereby all the food is cooked and removed therefrom without the usual splattering of the drippings and soiling of the kitchen furniture; and whereby food may be steamed thoroughly, and food already cooked preserved in its normal state. The invention relates to that class of cooking-utensils in which an inner pot with a perforated bottom is embraced by an outer inclosing fire-pot; and my said improvement therein consists in providing the periphery of the inner pot with three or more ribs extending from the top thereof about two-thirds its length, and which pass through notches or corresponding openings in the inner edge of the removable cap flange-piece of the outer pot, so that by raising the inner pot until the legs thereof are released from the said notches of the cap-plate, and by slightly turning the inner pot, the latter is firmly held and supported, and all the drainings to a drop are received by the outer vessel.

In the accompanying drawings, Figure 1 represents an elevation of my improved cooking-utensil, showing the inner pot raised and resting upon the flange cap-plate of the outer pot, in the act of draining, steaming, or preserving food already cooked. Fig. 2 represents a vertical section, showing the inner pot partly in elevation and partly in section; and Fig. 3 represents a horizontal section through the inner pot while resting in the outer.

The outer pot A is represented in the drawings as an ordinary sauce-pan, but it is obvious that the invention is applicable to any proper cooking-vessel. This outer pot is provided with a removable flanged cap-piece, B, having three or more notches, *b*, in its inner rim, the function of which will be presently described. The inner pot or food receptacle C has a projecting rim or top band, D, which rests upon the cap-plate B, and thereby supports said inner pot. The boiling water or fluid mingles with the articles to be cooked in the vessel C through the perforated bottom E thereof. Upon the periphery of the inner pot C, commencing at the overlapping rim D thereof and extending about two-thirds of its length, are projecting ribs *a*, which pass through the notches *b* of the cap-plate.

Thus the outer vessel is placed upon the fire filled with water, the food being placed in the inner vessel, it is inserted in the outer, the ribs passing through the notches until the rim of the inner vessel rests upon the flanged cap of the outer, and the cooking process begins. When the food is cooked, the inner vessel is raised until its ribs are released, it is then slightly turned axially and rests (as seen in Fig. 1) upon the cap-plate of the outer vessel. In this position it may remain until the draining is thoroughly effected, when the food may be prepared for the table without the heretofore attendant slopping and splattering. In this position, also, articles of food may be steamed, a most desirable form of cooking. In this position, further, one's dinner may be preserved in its normal state for hours after it has been prepared for the table.

The various parts of the device are easily separated and cleansed, and it is cheap in construction.

Having described my invention, I claim—

In a cooking-vessel, such as described, an inner vessel with vertical ribs upon its periphery passing through corresponding notches in the cap-plate of the outer vessel, so that the inner one may rest thereon in the manner and for the purpose described.

EDWIN J. SPRAGUE.

Witnesses:
L. BOOTH,
G. J. MARGERUM.